United States Patent Office
2,898,451
Patented Aug. 4, 1959

2,898,451

LAMP SHADE

Herman Th. J. A. Busquet, Huis ter Heide, Netherlands, assignor to "Hala" Nederlandsche Lampenfabriek N.V., Zeist, Netherlands, a Dutch limited-liability company Application August 14, 1957, Serial No. 678,076

Claims priority, application Netherlands May 24, 1957

3 Claims. (Cl. 240—108)

The invention relates to lamp shades of the type having a perforated case of material which is impervious to light.

Such lamp shades are used in various shapes and with many types of perforations. Without extra measures, these lamp shades have the disadvantage that light passes directly through the perforations and causes an annoying effect while, moreover, the light can directly hit the eye of an observer.

The invention provides measures for obviating the abovementioned disadvantages.

More particularly, the invention is characterized in that within the said case a second case of preferably similar material and substantially the same shape as the outer case is provided, which inner case has substantially the same perforation pattern as the outer case. The apertures of the inner case are, however, shifted with respect to those of the outer case, and the distance between inner and outer cases is small with respect to the dimensions of these cases.

The result of these provisions of the invention is that the light in general will reflect between the inner case and the outer case before coming out of the perforations of the outer case.

This result, however, can still be improved according to the invention by shifting the apertures of the inner and outer cases in such a way that the light cannot pass in a rectilinear path via the apertures of the inner case through the apertures of the outer case. As a result, no direct light is provided at all so that the brightness of the said apertures remains within suitable limits. Moreover, even though a metal inner case is used behind the apertures of the outer case, the effect of a transparent material such as silk or plastic is obtained.

The invention will be further elucidated in connection with the accompanying drawings in which.

Figure 1:
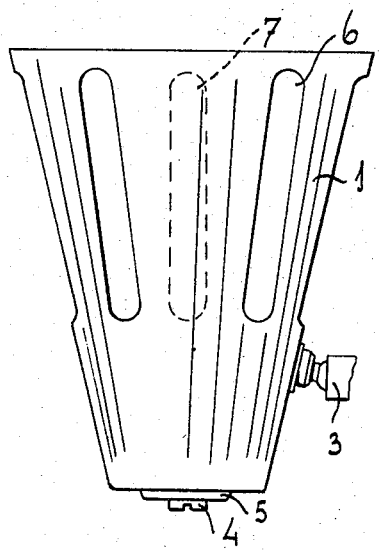
Figure 1 shows an embodiment of the invention suitable for a wall lamp.

In Figure 1 is shown a lamp shade for a wall lamp which by means of a suitable mounting connection 3 is connected to a mounting fixture (not shown). The lamp shade comprises a metal outer case 1 with elongated slots 6 as also shown in Figure 3.

Figure 2:
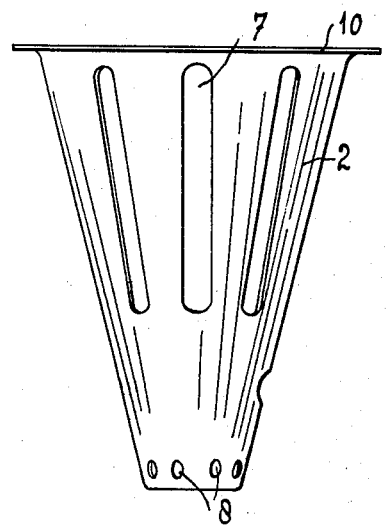
Figure 2 is a side view of the inner case of Figure 1.

In Figure 2 is shown the corresponding conical metal inner case 2 having corresponding elongated slots 7. The inner case 2 at its one end has a flange 10. Also in Figure 2 are shown ventilation openings 8.

Slots 6 and 7 may, as shown in the drawing, extend over half the lengths of the case walls and from adjacent the open ends.

Figure 3:
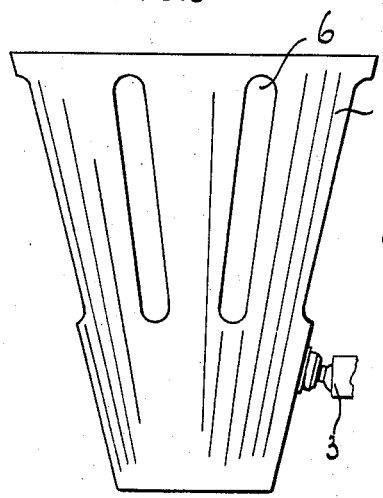
Figure 3 is a side view of the outer case of Figure 1.
Figure 4:
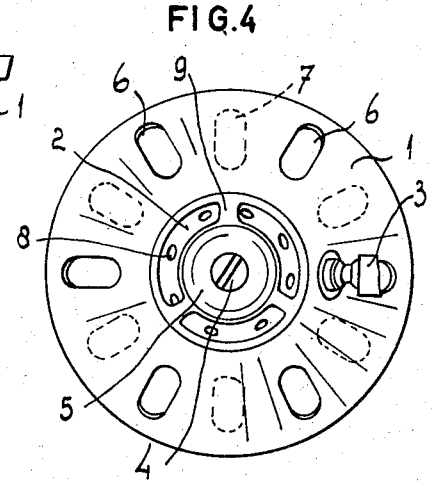
Figure 4 is a bottom view of the structure shown in Figure 1.

In combining the inner case 2 of Figure 2 and the outer case 1 of Figure 3, the connection between the said cases is made such that, as will be seen in Figures 1 and 4, the slots 6 of the outer case 1 and the slots 7 of the inner case 2 are shifted with respect to each other. In Figures 1 and 4, the said slots 7 of the inner case have been illustrated by dotted line.

In Figures 1 and 4 are seen a mounting screw 4 and a small cover plate 5. By means of the said screw 4 and plate 5, the inner and outer cases are connected coaxially as a result of which the flange 10 of the inner case 2 is placed exactly within the circumferential edge of the outer case 1. Therefore, the cases are connected in light tight manner at this end and light can only come out of the slots 6.

It will be clear that, for the shifted positions of the apertures of the inner and outer cases, it is not necessary that both cases be of metal or conical. The effect of the invention can be obtained if, for example, the cases are cylindrical, partially spherical or the like. Although the embodiment uses metal cases, other materials impervious to light may also be used for the said cases.

Finally, the ventilation openings 8 of Figure 2 are also shown in Figure 4, the said openings cooperating with arcuate slots at the smaller end of the outer case 1 which arcuate slots are interrupted by metal plates 9.

What is claimed is:

1. A shade for a source of light comprising first and second shade members each having an open end and a substantially closed end and a perforated wall intermediate said ends, said first shade member being smaller than said second shade member which is thus adapted to envelope said first shade member and define an intermediate space therewith, locking means at the closed ends for locking said members together with the perforations of the respective walls displaced so that said source of light is enabled to transmit light directly through said open ends and indirectly via said apertures, and a flange on one of the walls adjacent the associated open end bridging the space intermediate said members in light tight manner.

2. A shade as claimed in claim 1 wherein said locking means comprises a bolt and said closed ends define openings for accommodating said bolt.

3. A shade as claimed in claim 1 wherein said apertures are elongated slots extending over half the lengths of said walls and from adjacent the open ends.

References Cited in the file of this patent

UNITED STATES PATENTS

| 337,548 | Bacon | Mar. 9, 1886 |
|---|---|---|
| 2,456,903 | Versen | Dec. 21, 1948 |
| 2,515,236 | Kunins | July 18, 1950 |
| 2,567,403 | Rockola | Sept. 11, 1951 |